Oct. 15, 1968 V. E. FORD ET AL 3,405,623

PHOTOGRAPHIC EXPOSURE CONTROL APPARATUS

Filed Dec. 27, 1965

INVENTORS
Vernon E. Ford
and
BY Robert P. Forsyth
Brown and Mikulka
and
Charles S. McGuire
ATTORNEYS United States Patent Office 3,405,623
Patented Oct. 15, 1968

3,405,623
PHOTOGRAPHIC EXPOSURE
CONTROL APPARATUS
Vernon E. Ford, South Hanover, and Robert P. Forsyth, Boston, Mass., assignors to Polaroid Corporation, Cambridge, Mass., a corporation of Delaware
Filed Dec. 27, 1965, Ser. No. 516,644
9 Claims. (Cl. 95—53)

This invention relates to photographic exposure control and more specifically to apparatus capable of controlling the passage of light to a photosensitive film, or the like, without the use of the usual rigid, mechanically movable light barrier members.

In the usual photographic camera, diaphragm means are provided to form an exposure aperture for the entry of light to strike the film and opaque shutter means, such as one or more blades, are moved between open and closed positions with respect to the exposure aperture to permit passage of light therethrough for a predetermined time period. The shutter means may be so constructed that an aperture for the passage of light is formed by portions of the blades in moving to the open position, the shutter means thus serving also as a diaphragm. In either case, however, the passage of a predetermined amount of light is controlled by movement of one or more solid, opaque members in a mechanical manner. The present invention, on the other hand, contemplates an exposure control device wherein the passage of light is controlled by the movement of a fluid in a predetermined manner to block and unblock a light path along the optical axis of a camera.

In a preferred embodiment, the invention utilizes two fluids, one in the form of a substantially opaque liquid and the other a clear, transparent liquid. The structure includes a chamber lying across the optical axis of the camera with which the device is associated. When the chamber is filled with the aforementioned opaque liquid, light is prevented from passing through the camera optical system to strike the photosensitive film within the camera. Means are provided for evacuating at least a portion of the opaque liquid from the chamber to permit the passage of light through the optical system in the area so evacuated, and for returning the opaque liquid into the chamber to block the passage of light again. The device may be used as a shutter, or a combined shutter-diaphragm, by effecting movement of the opaque fluid in a time controlled manner, or merely as a diaphragm to establish an exposure aperture of any desired size. One effective method for evacuating the opaque liquid from the chamber is by forcing a transparent liquid into the chamber on the opposite side of a thin, flexible membrane from the opaque fluid. Appropriate reservoirs are provided for each of the liquids as the latter pass into and out of the chamber. The center of the chamber is preferably coincident with the optical axis of the lens system and the opaque fluid is moved outwardly from the center, thereby making the structure suitable for use in forming the exposure aperture as well as the shutter means. The chamber may be formed in a centrally disposed portion of a lens element of the camera which is designed to take into account the index of refraction of the transparent liquid or other medium used to force the opaque liquid out of the chamber, thereby being interposed in the camera optical system during exposure.

It is a principal object of the present invention to provide camera exposure control means having no solid, mechanical members for controlling the amount of light used to effect a photographic exposure.

Another object is to provide apparatus in the nature of a camera exposure control device wherein photographic exposures are controlled by means of an opaque fluid movable to block and unblock passage of light to the film.

A further object is to provide photographic exposure control apparatus which may be incorporated into a single lens element of the camera objective system without adversely affecting the optical properties thereof.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

The invention is shown and described somewhat diagrammatically in a relatively simple embodiment, although a complete understanding of the general nature and various possible means of construction will be gained therefrom by those skilled in the art. It will be understood, of course, that the illustrated structure is to be incorporated in a photographic camera in the usual manner with a protected light path between the camera objective lens system and the film plane, the exposure control apparatus of the invention being interposed in this path to control the passage of light to the film. The assumed optical axis of the camera is indicated in the appropriate figures of the drawings by the line A—A. In the illustrated embodiment, the exposure control apparatus is incorporated into a lens element of the camera objective system. This element is formed in two sections which are joined together to form a composite structure, a centrally disposed portion of which serves as the said lens element.

Figure 1:
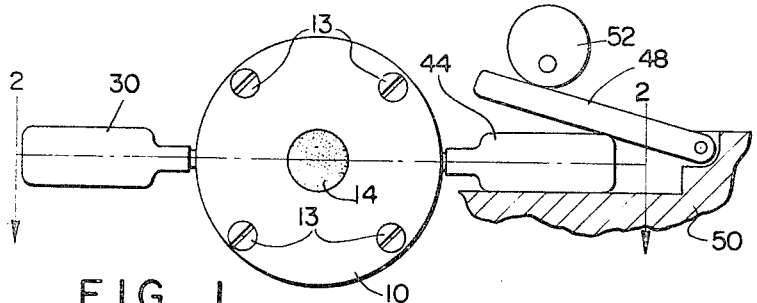
FIGURE 1 is a diagrammatic front elevational view of one form of suitable structure embodying the present invention.
Figure 3:
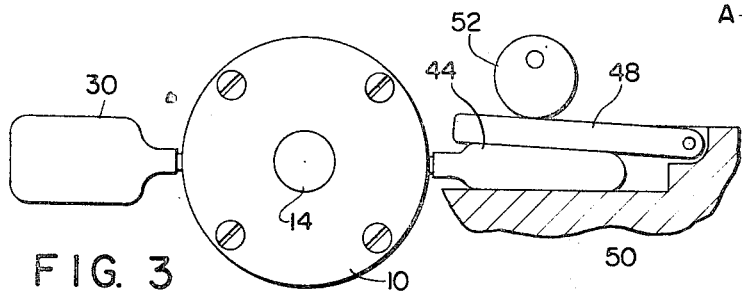
FIG. 3 is a front elevational view showing the apparatus of FIGURE 1 in a second condition.
Figure 5:
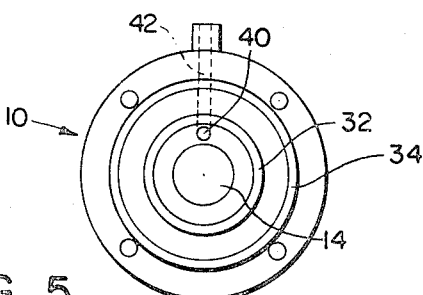
FIG. 5 is an elevational view of one portion of the apparatus of FIGURE 1.
Figure 6:
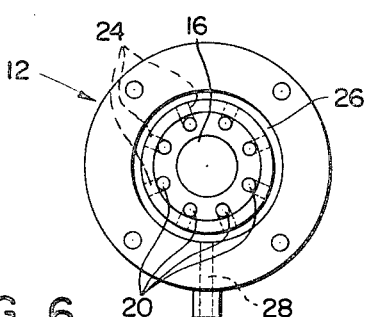
FIG. 6 is an elevational view of a second portion of the apparatus of FIGURE 1.

Front section 10 is shown in the elevational views of FIGURES 1 and 3, and is shown separately from the opposite side in FIG. 5. Rear section 12 is joined by any convenient means, such as screws 13, cementing, snap fit, etc. to front section 10 and is shown in FIG. 6 from the side which faces section 10 when the two sections are joined. Sections 10 and 12 are formed separately from a material having properties which make it suitable for use as a camera objective lens. Centrally disposed, mutually aligned portions 14 and 16 of sections 10 and 12, respectively, serve as the camera objective lens, or as one element of a multi-element lens system. Accordingly, the outer portion of sections 10 and 12, surrounding portions 14 and 16, are opaque. Any of a wide number of suitable plastic materials, for example, are commonly available for use as lens materials and may be easily made either transparent or opaque so that sections 10 and 12, including central portions 14 and 16, may be made of the same type of material if desired, suitable examples of such being set forth hereinafter. The transparent and opaque portions of the two sections could most conveniently be initially formed as separate units and later fused together, or otherwise maintained in proper relationship.

Figure 2:
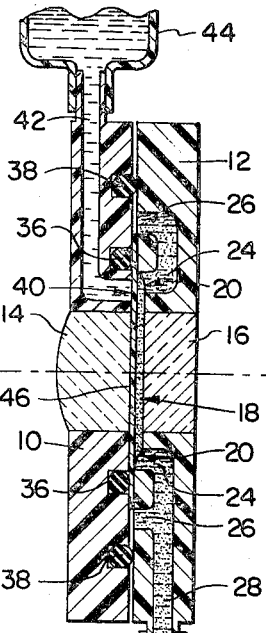
FIG. 2 is an enlarged cross-sectional view of the apparatus of FIGURE 1 in section on the line 2—2 thereof.
Figure 4:
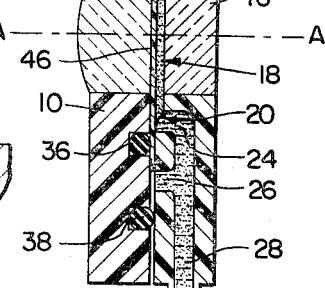
FIG. 4 is an enlarged cross-sectional view on the line 4—4 of FIG. 3.

The adjoining, or interface, surfaces of elements 10 and 12 are preferably planar, at least in the areas surrounding portions 14 and 16. Thus, when the two sections are joined together, as best seen in FIGS. 2 and 4, the interface surfaces may be held in close engagement. The interface surfaces in the area of portions 14 and 16 are spaced from one another to provide chamber 18 between the two sections. In the illustrated embodiment, chamber 18 is provided by forming a recess in the centrally disposed portion of section 12 on the interface side thereof. A plurality of openings 20 are provided in section 12 surrounding the recess in the centrally disposed portion thereof, as best seen in FIG. 6. Openings 20, each communicate, through suitable enclosed channels 24 formed within section 12, with annular recess 26 which is formed in the interface surface of section 12 and concentrically surrounds openings 20. Recess 26 communicates through enclosed channel 28 with reservoir 30 outside section 12.

Section 10 includes concentric, annular recesses 32 and 34 (FIG. 5) formed in the interface surface thereof for the purpose of holding suitable sealing means, such as rubber O-rings 36 and 38 (FIGS. 2 and 4). Opening 40 in the interface surface of section 10 communicates through enclosed channel 42 with reservoir 44. Thin, flexible membrane 46 is engaged between the interface surfaces of sections 10 and 12, and extends completely across chamber 18.

Reservoirs 30 and 44 are provided for the purpose of holding suitable fluids which are conducted, through the aforementioned channels and openings, into and out of chamber 18 on opposite sides of membrane 46. In the position of the elements shown in FIGURES 1 and 2, chamber 18 is filled with an opaque fluid on the side of membrane 46 facing rear section 12. Reservoir 44 holds a suitable transparent fluid which may be forced into chamber 18 on the side of membrane 46 which faces front section 10. The fluid from reservoir 44 may be forced into chamber 18 by any desired method, such as by a movable piston within reservoir 44, by applying a vacuum within reservoir 30, or by mechanically constricting reservoir 44 in the manner shown in FIGURES 1 and 3. As diagrammatically indicated in these figures, arm 48 is movably mounted on a suitable rigid support 50 for engagement with reservoir 44, which is made of a flexible material, completely filled with the transparent fluid, in the illustrated embodiment. Movement of arm 48 from the position of FIG. 1 to that of FIG. 3 serves to compress reservoir 44 between arm 48 and support 50, thereby forcing a quantity of the transparent fluid within reservoir 44 through channel 42 into chamber 18.

Upon being forced out of reservoir 44, the transparent fluid enters chamber 18 forcing membrane 46 toward portion 16 of rear section 12. O-ring 36 seals chamber 18, outside of openings 20, thus preventing the transparent fluid from escaping from chamber 18. Movement of membrane 46 toward portion 16 forces the opaque fluid out of chamber 18 through openings 20 into recess 26 and out through channel 28 into reservoir 30. A plurality of openings 20 and channels 24 are provided between chamebr 18 and recess 26 so that the opaque fluid will be quickly evacuated from chamber 18 upon introduction of the transparent fluid into the chamber. The opaque fluid is prevented from escaping from recess 26 by O-rings 36 and 38 which seal the interface surfaces of sections 10 and 12 on each side of recess 26. Since membrane 46 is supported by its engagement between sections 10 and 12 around the periphery of chamber 18, the introduction of the transparent fluid to force the membrane toward rear section 12 will cause the membrane to act as a beam, having the greatest deflection in the area of least support, i.e., the center. Thus, membrane 46 will be sufficiently deflected to contact portion 16 of section 12 from the center (optical axis A–A) outwardly toward the edges as the transparent fluid fills chamber 18. Although membrane 46 is engaged between sections 10 and 12, it need not be of a highly elastic material since the distance of movement is preferably small relative to the diameter.

Exposure of the film within the camera will commence as soon as membrane 46 has contacted portion 16 and continue until the opaque fluid has again been returned into chamber 18 in sufficient quantity as to be completely interposed across chamber 18. Again, the opaque fluid may be forced out of reservoir 30 and back into chamber 18 by any convenient method. For example, reservoir 30 may be made of an elastic material so that the walls of the reservoir exert a biasing pressure on the opaque fluid tending to force it back into chamber 18. This biasing force, of course, would not be as great as the force holding arm 48 in engagement with reservoir 44, but would be great enough to force the opaque fluid back into, and the transparent fluid out of, chamber 18 when the force of arm 48 is removed from reservoir 44, relieving the pressure on the clear fluid.

Arm 48 may be moved to engage and disengage reservoir 44 in any desired manner, of course, since the particular method or arrangement used for moving the fluids into and out of chamber 18 forms no part of the present invention. Construction of the invention using a wide variety of means for effecting such movement in a controlled manner is well within the purview of those skilled in the art. By way of example, there is shown in FIGURES 1 and 3 rotatable cam 52 having a surface which engages arm 48. The amount of rotation of cam 52 from the position shown in FIGURE 1 will determine the amount of movement of arm 48, and thus the amount of transparent fluid forced into chamber 18 and the size of the aperture formed thereby. The speed of rotation of the cam will determine the length of time during which the transparent fluid remains in the chamber and permits light to pass to the film. Thus, both the size of the opening through which light passes and the time interval during which the passage of light is unblocked, may be easily controlled. Again, the control means may take any convenient, previously known form, including purely mechanical systems which are manually set as well as the more recent photoresponsive, electronic, control circuits which are automatically controlled as a function of scene brightness.

The various elements of the apparatus may be constructed from a wide variety of suitable materials as long as the necessary requirements of transparency and opacity are observed for the particular elements as set forth in the foregoing description. For example, sections 10 and 12 may be made from Plexiglas (methyl methacrylate) or other cast acrylic resins. Membrane 46 is preferably formed of a thin, flexible sheet which is dimensionally stable and impervious to the transparent and opaque fluids. Better results are also obtained by the use of a material which is not wetted by the fluids since the edge of the aperture formed by the transparent liquid will be sharper; an example of such material is clear Teflon. The opaque fluid may be any readily flowable material which completely occludes passage of light when arranged in a layer equal to the thickness of chamber 18. Mercury, for example, performs very well as the opaque fluid, but may be undesirable in such applications due to the potential health hazard and its generally deleterious effects on photosensitive films. A more common and acceptable material for use as the opaque fluid would be an aqueous, or other liquid, dispersion of carbon black, a suitable dye, or other opacifying agent. As the clear fluid, virtually any substantially transparent liquid or gas may be used; these would include air, water, alcohol, glycerine, etc. Turpentine has substantially the same index of refraction as Plexiglas, whereby when these two materials are used as the transparent fluid and the transparent means defining chamber 18 the lens design is unaffected by a consideration of indices of refraction, as when air, for example, is interposed in the path of light passing through a single lens element which, as previously mentioned, portions 14 and 16 may comprise.

From the foregoing description, it may be seen that the disclosed apparatus provides means for selectively forming an aperture for the passage of light along a path which is blocked by an opaque fluid prior to actuation of the device. The light path is formed by interposing a transparent fluid between two transparent portions of solid means defining a chamber. As previously mentioned, the solid transparent portions with the transparent fluid and membrane interposed therebetween may cooperate to form a lens element of the camera objective system. When this is the case, the index of refraction of the transparent fluid and the membrane should preferably be the same as that of the solid transparent portions. Alternatively the latter may be of such optical design as to produce a lens effect which takes into account the difference in indices of refraction to produce the desired optical qualities. Since the opaque fluid is forced out of chamber 18 outwardly from the center, an opening of any desired diameter may be formed in accordance with the amount of transparent fluid which is forced into the chamber. Likewise, the time interval during which light is allowed to pass through the opening so formed may be selectively controlled. Thus, the disclosed apparatus may be utilized as a diaphragm means which forms an aperture of predetermined size and is uncovered and covered in a timed manner by separate shutter means. Alternatively, the device may be used solely as a shutter in combination with other diaphragm means, for example, by forcing a sufficient amount of transparent fluid into the chamber to completely evacuate the opaque fluid therefrom each time the device is actuated. By controlling both the amount of transparent fluid which enters chamber 18 and the time during which the opaque fluid is evacuated from the chamber, the device may be used as a combined diaphragm and shutter, and programmed to provide a wide range of exposure values by using, for example, shorter exposure times with smaller apertures and longer exposure times with larger apertures.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:
1. Photographic exposure control apparatus comprising, in combination;
   transparent means defining a chamber extending transversely across an optical axis;
   an opaque fluid arranged within said chamber to block passage of light along said optical axis;
   means including a flexible, transparent membrane for evacuating at least a portion of said opaque fluid from said chamber, said flexible transparent membrane extending across said chamber on one side of said opaque fluid, said opaque fluid being arranged between said membrane and one wall of said chamber; and
   hydraulic means for controllably producing a substantially uniform pressure on the surface of said membrane opposite the surface thereof adjacent said opaque fluid to move said membrane toward said one wall to force at least a portion of said opaque fluid out of said chamber, thereby unblocking said passage of light.
2. The invention according to claim 1 wherein said membrane is supported around the periphery of said chamber, whereby the point of least support is at the center and said opaque fluid is forced out of said chamber from the center outwardly as said membrane is moved toward said one wall.
3. The invention according to claim 2 wherein said hydraulic means comprises a transparent fluid and means for introducing the same into said chamber on the opposite side of said membrane from said opaque fluid.
4. The invention according to claim 3 wherein said transparent fluid comprise a clear liquid.
5. The invention according to claim 4 wherein said transparent means comprise a pair of solid portions, spaced from one another in the area of said chamber, forming a lens element.
6. The invention according to claim 5 wherein the indices of refraction of said transparent, solid portions and said transparent fluid are substantially equal to one another.
7. The invention according to claim 3 and further including first enclosed channel means communicating at one end with first reservoir means and at the other end with said chamber on the side of said membrane facing said one wall, whereby said opaque fluid flows through said first channel means between said first reservoir means and said chamber in moving to block and unblock said passage of light.
8. The invention according to claim 7 and further including second enclosed channel means communicating at one end with second reservoir means and at the other end with said chamber on the side of said membrane opposite the side facing said one wall, whereby said transparent fluid flows through said second channel means between said second reservoir means and said chamber in moving to force said opaque fluid out of said chamber.
9. A photographic exposure control device comprising:
   solid light transmitting means containing an interior chamber extending transversely across an optical axis;
   a flexible, transparent membrane supported about the periphery of said chamber and extending transversely across said chamber dividing it into first and second portions each having an inwardly facing end wall;
   pressure-inducing reservoir means communicating with said first portion of said chamber;
   an opaque fluid filling said first portion of said chamber and maintained therein by the pressures induced by said reservoir means; and
   means for controllably introducing a clear fluid into the second portion of said chamber and for varying the pressure thereon to force said membrane against the end wall of the first portion of said chamber, thereby driving at least a portion of said opaque fluid from the central portion of said chamber and permitting light to pass through said device along the optical axis thereof, the relief of pressure on said first fluid permitting said opaque fluid to be restored to the first portion of said chamber to block light along the axis of said device.

References Cited

UNITED STATES PATENTS

| | | | |
|---|---|---|---|
| 2,373,214 | 4/1945 | Wolkenhauer | 350—267 |
| 2,481,660 | 9/1949 | Harrison | 95—64 |
| 2,986,982 | 6/1961 | Kaprelian | 95—53 |

JOHN M. HORAN, *Primary Examiner.*